United States Patent [19]
Clarke

[11] 3,938,024
[45] Feb. 10, 1976

[54] CONVERTER REGULATION BY CONTROLLED CONDUCTION OVERLAP

[75] Inventor: Patrick William Clarke, Murray Hill, N.J.

[73] Assignee: Bell Telephone Laboratories, Incorporated, Murray Hill, N.J.

[22] Filed: Jan. 6, 1975

[21] Appl. No.: 538,593

[52] U.S. Cl. ................. 321/2; 321/9 A; 321/18; 321/45 R
[51] Int. Cl.² ................................. H02M 3/335
[58] Field of Search .............. 321/9 A, 11–14, 321/45, 18, 2

[56] References Cited
UNITED STATES PATENTS

| | | |
|---|---|---|
| 3,303,406 | 2/1967 | Bedford .................. 321/45 R X |
| 3,349,314 | 10/1967 | Giannamore ............... 321/45 R X |
| 3,378,751 | 4/1968 | Walker ..................... 321/18 X |
| 3,504,264 | 3/1970 | Suelzle .................... 321/45 R X |
| 3,667,027 | 5/1972 | Martin ..................... 321/18 X |
| 3,683,264 | 8/1972 | Schieman et al. ............ 321/19 X |
| 3,701,937 | 10/1972 | Combs ..................... 321/18 X |
| 3,835,365 | 9/1974 | Ekstrom et al. ............. 321/13 X |
| 3,859,586 | 1/1975 | Wadlington ................. 321/18 |

*Primary Examiner*—William M. Shoop
*Attorney, Agent, or Firm*—A. G. Steinmetz

[57] ABSTRACT

The regulation control for a DC to DC converter controls the duration of overlapping conduction periods of oppositely phased switching devices to achieve output signal regulation. Current limiting means is included in the signal path of the switching devices to prevent transient overcurrents during the period of overlap.

11 Claims, 6 Drawing Figures

CONVERTER REGULATION BY CONTROLLED CONDUCTION OVERLAP

BACKGROUND OF THE INVENTION

1. Field of the Invention

A converter circuit is disclosed herein with particular attention given to the method of regulating the output signal of the converter. Specifically described is the operation of the switching devices of the converter and how this operation is controlled to secure regulation of the converter output signal.

2. Prior Art

A typical converter circuit of the prior art having a double-ended, push-pull type configuration is shown in FIG. 1 of the drawings. This converter circuit includes two switching devices which are alternately pulse width modulated to secure regulation of the converter output signal. The two switching devices comprise two alternately switched switching transistors 110 and 120 whose main conductive paths couple the primary winding 103 of a power transformer 101 to a ground terminal of a voltage source 104. The other terminal of the voltage source 104 is coupled to a center tap 100 of the primary winding 103 via a lowpass filter including the inductor 105 and the capacitor 106. The output winding 102 of the power transformer 101 is connected to a rectifier comprising the rectifying diodes 113 and 114 which in turn are connected to an output lowpass filter including the inductor 107 and the capacitor 108. A resistive load 109 to be energized is connected across the capacitor 108. Two voltage sensing leads 125 and 126 connect opposite terminals of the load 109 to a regulation control circuit 116. The regulation control circuit 116 includes an internal reference signal with which the load voltage is compared. The regulation control circuit 116 generates bias signals which are coupled to the base electrodes 111 and 121 to control the conductivity of the switching transistors 110 and 120 to maintain the desired output voltage at the load 109.

The operation of this typical converter circuit may be readily explained with reference to FIG. 2 which discloses waveforms illustrating the signals occurring within the converter circuit. The regulation control circuit 116 in response to the output voltage signal sensed by leads 125 and 126 applies bias signals to the base electrode 111 and the base electrode 121 to control the alternate duration of conduction of the transistors 110 and 120, respectively, in order to regulate the output signal of the converter. The alternate intervals of conduction of the transistors 110 and 120 are shown by the waveforms $Q_1$ and $Q_2$, respectively. The solid lines 201 and 202 of waveforms $Q_1$ and $Q_2$ represent the alternate conduction intervals of transistors 110 and 120, respectively. The conduction duration intervals $a_1$, $a_3$, and $a_5$ shown in FIG. 2 represent the successive conduction intervals of the transistor 110. The conduction duration intervals $b_2$, $b_4$, and $b_6$ represent the successive conduction intervals of the transistor 120. As is apparent from the waveforms $Q_1$ and $Q_2$, the conduction intervals of transistors 110 and 120 are mutually exclusive. At no time do both of the transistors 110 and 120 conduct simultaneously. An interval of nonconduction $x$ occurs between the alternate conduction intervals $a$ and $b$.

The voltage waveform $VQ_1$ represents the voltage drop across transistor 110, and the voltage waveform $VQ_2$ represents the voltage drop across transistor 120. During the conducting interval $a_1$, it is apparent from the waveform $VQ_1$ that the voltage drop across transistor 110 is either zero or a very small value since transistor 110 is in its saturated conduction state. As soon as the conducting interval $a_1$ is terminated, a voltage spike 203 appears across transistor 110. This spike decays and the voltage subsequently rises to the steady state voltage value shown by the voltage level 204. This steady state voltage value is approximately twice the voltage of source 104. Similarly, the voltage drop across transistor 120 at the end of conduction interval $b_2$ rises to a peak value shown by the spike waveform 205 and subsequently decays and then rises to a steady state voltage level 206 which is approximately twice the voltage of source 104. The voltage spikes 203 and 205 are due to the reverse EMF of the transformer 101 when current conduction is initially cut off in the primary winding 103.

The output voltage appearing across the secondary winding 102 is shown by the voltage waveform $V_s$. The voltage spikes 207 and 208 occur coincident with the voltage spikes 203 and 205 of waveforms $VQ_1$ and $VQ_2$, respectively. The voltage spikes 207 and 208 decay and the subsequent square wave voltage waveform 219 is generated coincident with the conducting intervals of the two switching transistors 110 and 120. This square wave voltage appears across the secondary winding 102 of the converter. The abrupt switching of transistors 110 and 120, in conjunction with the nonconducting intervals $x$ of the two switching transistors 110 and 120, generates the current waveform spikes in the current waveform $I_1$. This current waveform spike occurs when the transistors 110 and 120 are switched into their conducting state. For example, the current spike 209 of the current waveform representing the current $I_1$ flowing through the center tap 100 of the primary winding 103 occurs when the transistor 110 is biased into its conducting state. This spike rapidly decays and the current subsequently gradually increases as shown by ramp function current waveform 210.

In general, the regulation control 116 alternately drives the switching transistors 110 and 120 with square wave pulse bias signals. The two transistors 110 and 120 are alternately switched into conduction. The current flowing through each transistor is directed through opposite halves of the center tapped primary winding 103 of the transformer 101. This results in the approximate square wave voltage $V_s$ occurring across the secondary winding 102.

The typical push-pull type converter circuit, as described above, generally requires many circuit components in addition to those shown to compensate for the inherently disadvantageous characteristics of the converter circuit. For example, the input impedance of a conventional push-pull converter tends to be capacitive, causing large inrush currents when the ciruit is initially energized.

As shown by the above-described waveforms, peak transient voltages and currents occur due to the conduction discontinuity when both switching transistors are biased nonconducting. This requires large capacity switching transistors and converter power transformers to deal with these peak transient currents and voltages. In addition, symmetry correction is frequently necessary to prevent the transformer from drifting into saturation due to unequal parameter characteristics of the two switching transistors. A converter circuit such as disclosed in FIG. 1 normally requires both an input filter and an output filter. Should the converter circuit have multiple outputs, a filter inductor is required for each of the individual outputs.

SUMMARY OF THE INVENTION

The disadvantages described above in the prior art push-pull type converter circuit are alleviated in the circuit described herein by use of a different regulation arrangement which permits greater control of currents in the primary side of the converter and continuity of current flow to reduce the peak transient voltages and currents in the converter switching devices.

Therefore, in accordance with a circuit embodying the principles of the invention, a DC to DC converter circuit is provided with current limiting means on the primary side of the converter transformer. The switching devices are controlled so that their conducting intervals overlap. Regulation of the signal output of the converter is controlled by precisely regulating the time duration of the overlapping conduction intervals during each cycle. The current limiting means may advantageously comprise an inductor which is substantially large so that it may function as a current limiting means as well as a chief filter inductor in the converter for both the input and output circuits. The use of a single inductor in the input as the only filter inductor in the circuit permits the use of multiple outputs with a single filter inductor. The current limiting action of the single inductor in conjunction with the overlapping conduction intervals limits the peak transient current spikes on the primary side of the converter circuit.

Precisely, the invention is concerned with controlling the magnitude of the signal output of a double-ended or push-pull configuration converter circuit by varying the ratio of the duration of overlapping conducting intervals of the two switching transistors to the total period of oscillation of the converter. Signal limiting means is included to prevent peak transient signals.

This improvement provides many advantages. For example, it eliminates the need for inrush current limit controls because the input impedance of the converter circuit is the inductive impedance of the current limiting means. It permits the more efficient use of the converter's power transformer because symmetry correction is no longer a significant problem since the primary currents are limited by the inductive impedance. In addition, multiple outputs can utilize a single filter inductor located on the primary side of the converter.

DETAILED DESCRIPTION OF THE EMBODIMENTS

Figure 1:
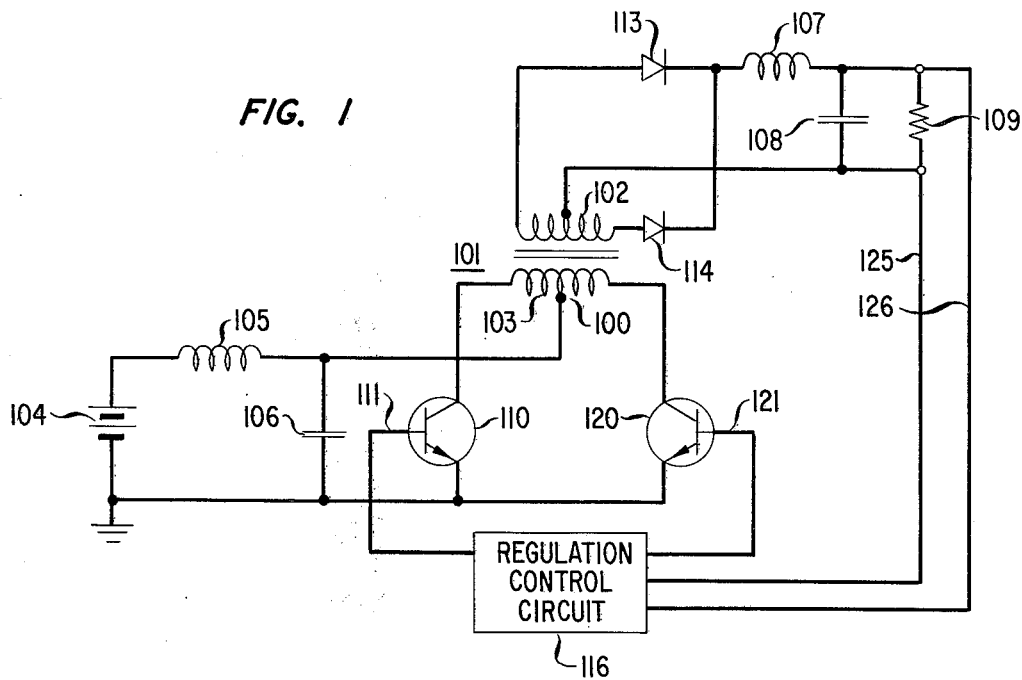
FIG. 1 discloses a schematic of a pulse width modulated converter circuit which is typical in the prior art and which has been described hereinabove.
Figure 2:
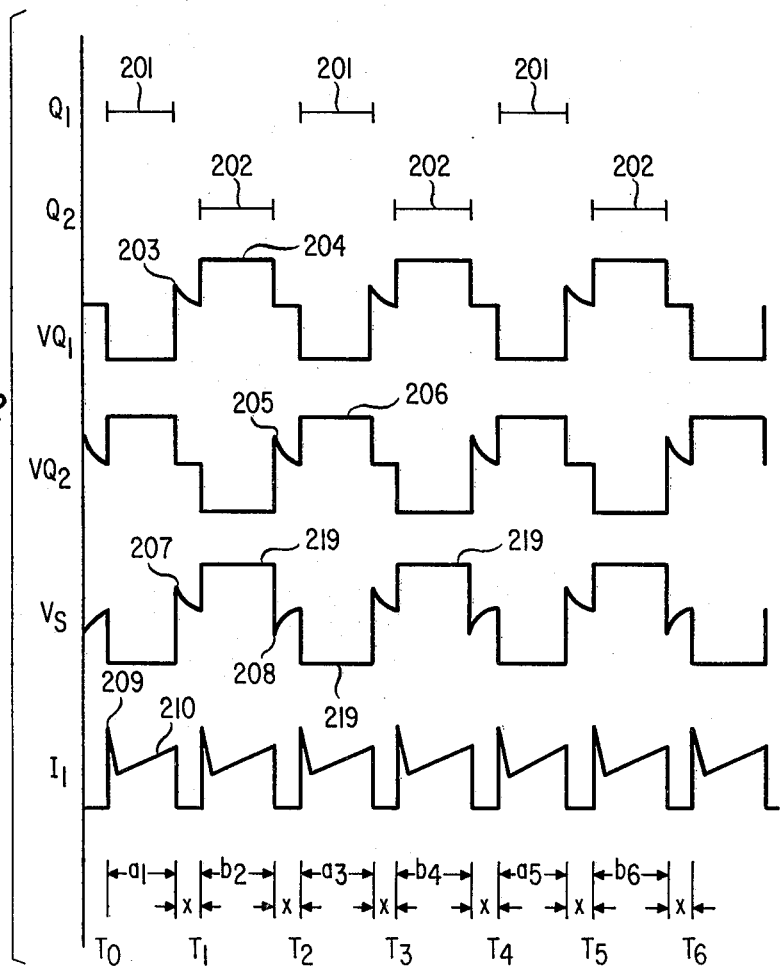
FIG. 2 discloses waveforms to assist in understanding the operation of the converter circuit schematically shown in FIG. 1.
Figure 3:
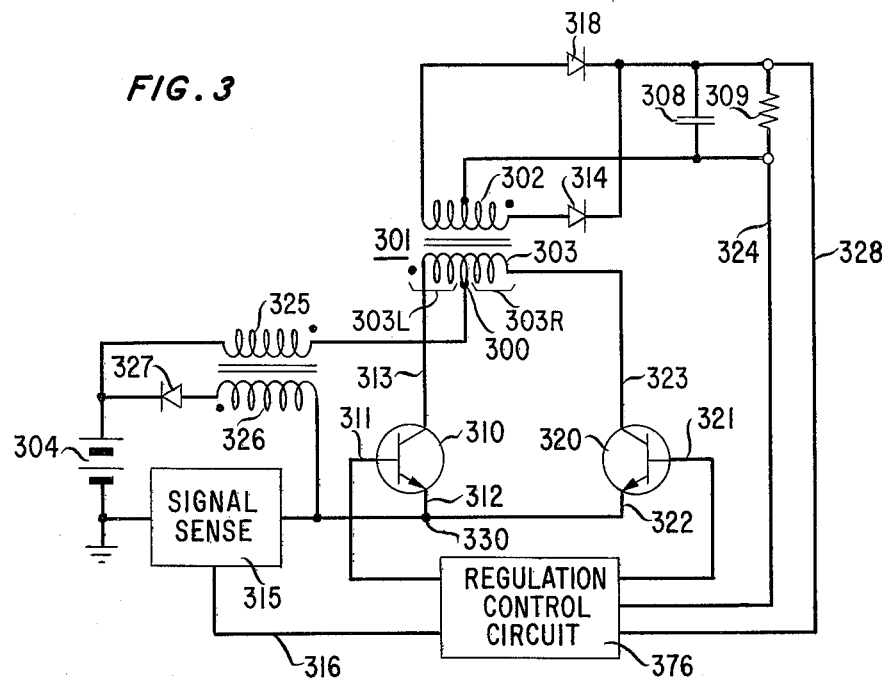
FIG. 3 discloses a schematic of a pulse width modulated converter circuit embodying the principles of the invention.

The converter circuits shown schematically in FIG. 3 comprises a push-pull converter circuit having control circuitry with a crossover mode regulation characteristic. The regulation control of this circuit embodies principles of operation in accordance with the invention. In the embodiment disclosed, the conducting intervals of the two switching transistors overlap. The ratio of the duration of this overlap to the oscillation period determines the magnitude of the output voltage. Current protection is also provided in the regulation control to permit a crossover into a current regulating mode should the current exceed a critical threshold.

A converter circuit disclosed comprises a power transformer 301 having a primary winding 303 and a secondary winding 302. The primary winding 303 has a center tap 300. Two switching transistors 310 and 320 have their collectors 313 and 323 connected, respectively, to opposite terminals of the primary winding 303. The emitters 312 and 322 are connected to a common node 330. This common node 330 is connected via a signal sensing circuit 315 to the ground terminal of battery 304. The other terminal of battery 304 is connected, via an inductor 325, to the center tap 300. The inductor 325 has sufficient inductance to operate as a current limiter and as a filter inductor for the converter circuit output signal. The secondary winding 302 has its opposite terminals connected to two rectifying diodes 318 and 314, respectively. The rectifying diodes 318 and 314 comprise a full wave rectifier which in turn is connected to an output capacitive filter 308 and from thence to a load 309 to be energized. It is noted that the output filter comprises only the capacitor 308, no inductor being necessary. The output inductive filtering is performed by the inductor 325 located on the primary side of the converter transformer. The switching of the transistors 310 and 320 is controlled in response to the regulation control circuit 376 which has bias signal leads connected to the base electrodes 311 and 321 of transistors 310 and 320, respectively.

The regulation control circuit 376 incudes two voltage sensing leads 324 and 328 coupled to the output terminals of the converter shunting the capacitor 308 and load 309. A current control lead 316 is connected to the signal sensing circuit 315. The regulation control circuit 376 is designed to operate in a crossover mode. That is, as long as the current detected by the signal sensing circuit 315 is within acceptable limits, the regulation control circuit 376 operates to regulate the output voltage at the load 309 at some definite value. If the current monitored by the signal sensing circuit 315 exceeds some predetermined limit, the current regulation becomes predominant and the conduction of the two switching transistors 310 and 320 is controlled to limit the current to that predetermined value.

In normal operation, the regulation control circuit controls the two transistors 310 and 320 so that their conduction intervals overlap. The duration of the conduction interval overlap is controlled to regulate the output voltage. Assuming that the converter has been in steady state operation for some period of time, the performance of the circuit is illustrated by the signal waveforms shown in FIG. 4. The solid lines 401 of waveform $S_1$ indicate the duration of the conduction intervals of the transistor 310. The solid lines 402 in waveform $S_2$ indicate the duration of the conduction intervals of the transistor 320. From examination of the solid lines 401 and 402 of the waveforms $S_1$ and $S_2$, it is apparent that overlap intervals occur at which the transistors 310 and 320 conduct simultaneously. The transistor 310, for example, conducts during the designated time intervals $\alpha_1$, $\alpha_3$, $\alpha_5$. The conducting intervals of transistor 320 are shown by the time intervals $\beta_2$, $\beta_4$, and $\beta_6$. The duration of overlap is a designated interval T to $t$ which occurs during each half-cycle of operation.

From examination of the waveforms it is apparent that, during interval $T_o$ to $t_o$, both transistors 310 and 320 are conducting. The voltage drop across the two transistors 310 and 320 during the interval $T_o$ to $t_o$ is zero as indicated by their voltage waveforms $E_1$ and $E_2$. Within this time interval the voltage drop across the secondary winding 302, shown by voltage waveform $E_s$, is zero. Current, however, is flowing in the primary side of the converter through the inductor 325. This current, shown by current waveform $A_1$, is increasing in magnitude during the interval $T_o$ to $t_o$, as shown by the ramp 403, and energy is being stored in the primary inductor 325.

At the termination of the first interval of simultaneous conduction $T_o$ to $t_o$, the regulation control circuit 376, in accordance with the output voltage sensed, biases the transistor 320 nonconducting. Hence, current ceases to flow in the right-hand side of the primary winding 303, designated in FIG. 3 as 303R. Current, however, continues to flow in the left-hand side of the primary winding 303 which is designated as 303L. The current signal in winding 303L forward biases the output rectifier diode 318. A current subsequent to the overlapping or simultaneous conduction interval $T_o$ to $t_o$ flows into the output circuit to the load 309. This output current is shown by the current waveform $A_2$. The capacitor 308 is utilized to filter the ripple of the output voltage.

At the termination of the overlapping conduction interval $T_o$ to $t_o$, the voltage across the transistor 320 rises to some fixed voltage as shown by voltage waveform $E_2$. This fixed voltage is related to the output voltage shown by waveform $E_s$ by the turns ratio of the transformer 301. The energy stored in the inductor 325 during the overlapping conduction interval of the two transistors 310 an 320 is now delivered to the output load.

Figure 4:
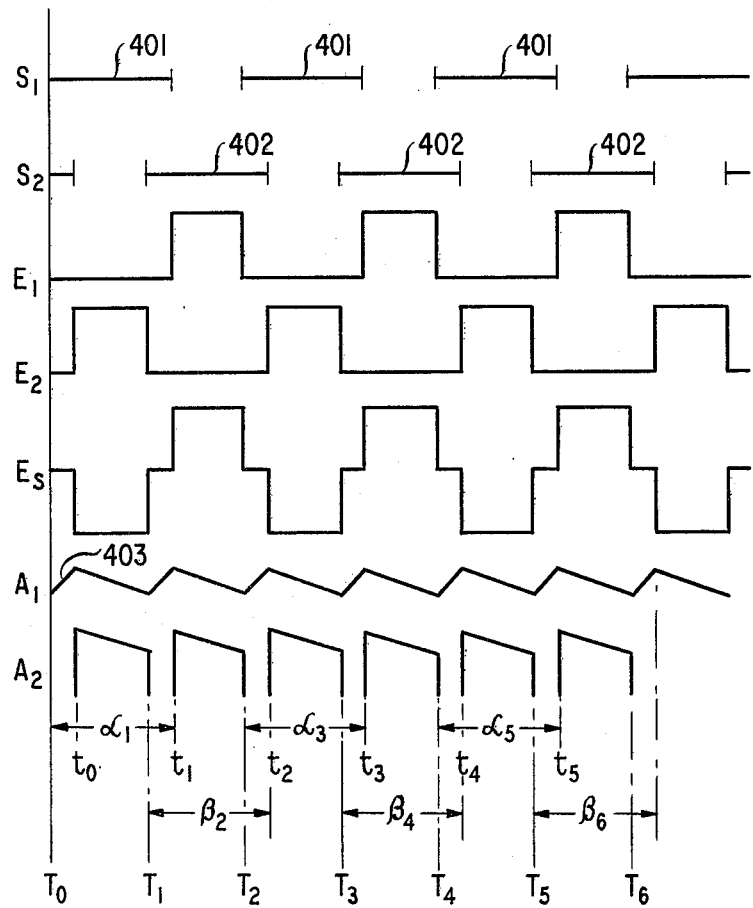
FIG. 4 discloses waveforms to assist in describing the operation of the converter circuit shown schematically in FIG. 3.

At time $T_1$ the first half-cycle of operation indicated by the waveforms in FIG. 4 is terminated. At this time $T_1$ the transistor 320 is switched back into its conducting state. The transistor 310 has been continuously conducting during the first half-cycle and continues to conduct into the second half-cycle $T_1$ to $T_2$. The transistor 310 continues to conduct for the simultaneous overlapping conduction interval defined by the time interval $T_1$ to $t_1$. At the termination of the time interval $T_1$ to $t_1$, the transistor 310 is biased nonconducting. The transistor 320 continues to conduct and the second half-cycle functions substantially the same as the first half-cycle described above with the exception that the conducting roles of transistors 310 and 320 are reversed.

It is apparent from examination of the waveforms and the description above that the output voltage of the converter circuit is determined by the formula:

$$E_{out} = K\, E_{in}\, P/[P-2x]N \; ; \; O \leq 2x < P$$

where:
K is the transformer coupling coefficient;
N is the turns ratio of the transformer;
P is equal to the period of oscillation of the converter; and
$x$ is the duration T to t of the conduction overlap.

As is apparent from the above formula, the output voltage is determined by the duration of the overlapping conduction interval. By increasing the duration of the overlapping conduction interval $x$ or T to $t$, the output voltage can be increased. Conversely, the output voltage can be decreased by decreasing the duration of the overlapping conduction inverval $x$. The current flowing in the primary of the converter is monitored by the signal sensing circuit 315 and in cases of overload is also regulated by controlling the duration of the overlapping conduction interval.

The converter circuit of FIG. 3 includes a clamping arrangement to prevent overvoltages on the primary side of the converter circuit. This clamping arrangement includes a secondary winding 326 coupled to the primary inductor 325. The secondary winding 326 is connected to the battery 304 by a diode 327 and to the common emitter node 330 of the converter. By selecting the windings ratio of winding 326 with respect to winding 325, the maximum voltage occurring on the primary side of the converter circuit can be precisely controlled. When the voltage across the secondary winding 326 exceeds the voltage of the battery 304, the diode 327 is forward biased thereby clamping the voltage of the primary side of the converter to some predetermined value.

Figure 5:
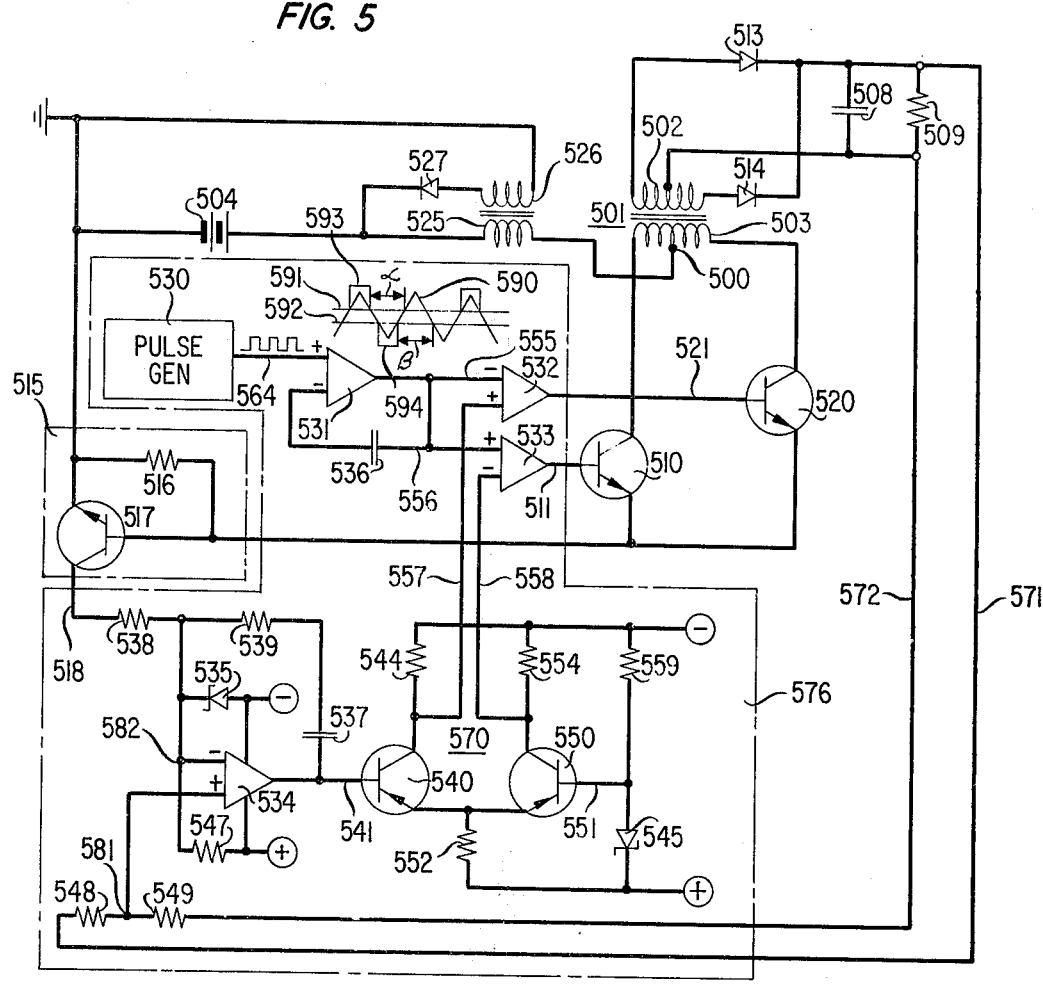
FIG. 5 discloses a more detailed schematic of the pulse width modulated converter disclosed in FIG. 3.

The circuit as disclosed in FIG. 3 provides many operating and component advantages as described hereinabove. For example, the large primary inductor 325 eliminates the need for inrush control circuitry, and by limiting the currents flowing through the transistors it permits the more efficient use of the converter transformer since saturation of a smaller size transformer no longer can cause large peak currents to flow through the switching transistors. In addition, symmetry correction circuitry is not generally needed to prevent drift saturation of the converter transformer. The schematic of a converter circuit shown in FIG. 5 shows in detail a regulation control circuit 576 to control the switching of the switching transistors 510 and 520. The converter circuit shown in FIG. 5 comprises a voltage source 504, a primary inductor 525 connected to the center tap 500 of primary winding 503, two switching transistors 510 and 520, and a voltage clamp comprising a secondary inductor winding 526 and diode 527. The output winding 502 of the transformer 501 is connected to the rectifying diodes 513 and 514 which in turn are connected via an output filter capacitor 508 to the load 509.

The converter shown in FIG. 5 operates in essentially the same manner as the converter described above in combination with FIG. 3.

The regulation control circuit 576 has two input voltage sensing leads 571 and 572, and is also connected to a current sensing circuit 515. In operation the regulation control circuit 576 establishes the operating frequency at which the converter oscillates by controlling the switching of the transistors 510 and 520. The regulation control circuit includes a pulse generator 530 to generate a train of pulses to establish the operating frequency of the converter. These pulses are applied via lead 564 to an integrating operational amplifier 531. The operational amplifier includes an integrating feedback capacitor 536 coupling its inverting input and output terminals. The output of the operational amplifier 531 is a triangular wave. The triangular wave is shown as waveform 590 adjacent to the lead 555. This triangular wave 590 is applied via leads 555 and 556 to the operational amplifier comparators 532 and 533, respectively. Threshold signal levels are applied via leads 557 and 558 to the operational amplifier comparators 532 and 533, respectively. These threshold signals are shown on the accompanying waveform by the threshold voltage levels 591 and 592. The α duration shown thereon represents the conducting interval of transistor 510 and the β duration shown thereon represents the conducting interval of transistor 520. It is noted that the conduction intervals of the two transistors 510 and 520 overlap. When the triangular wave voltage magnitude exceeds one of the threshold voltage levels 591 or 592, one of the switching transistors is biased nonconducting producing one of the square wave voltage waveforms 593 or 594 across transistors 510 or 520, respectively.

The two sensing leads 571 and 572 in combination with the two resistors 548 and 549 comprise a voltage divider connected across the output of the converter. The junction 581 of the two resistors 548 and 549 is coupled to the noninverting input of the operational amplifier 534. The operational amplifier 534 includes a stabilization feedback network comprising the resistor 539 and the capacitor 537. A reference signal is applied at a node 582 which is coupled to the inverting input of the operational amplifier 534. This reference signal is derived from a voltage divider comprising the Zener diode 535 and a resistor 547. The current sensing circuitry 515 is coupled to this voltage divider in order to modify this reference signal to permit a crossover mode of operation from voltage to current regulation. This crossover mode of operation is described below.

The output of the operational amplifier 534 is a signal whose level varies with the magnitude of the output voltage of the converter. This signal is applied to the base 541 of transistor 540.

The transistors 540 and 550 comprise the differential amplifier 570. A reference signal derived from a voltage divider comprising the Zener diode 545 and the resistor 559 is applied to the base 551 of the transistor 550. The output signals across the two load resistors 544 and 554 of the differential amplifier 570 are applied, via leads 557 and 558, to the two operational amplifier comparators 532 and 533, respectively. These signals represent the threshold level signals 591 and 592 shown with the triangular waveform 590. The differential amplifier operates in the well-known fashion to amplify the difference between reference voltage and the feedback voltage regulation signal to produce these two threshold signal levels. It is apparent from the foregoing that the overlapping conduction intervals of the two switching transistors 510 and 520 are continuously modified by continuously adjusting the threshold voltage levels 591 and 592 to maintain the output voltage of the converter at a regulated value.

The current sensing circuit 515 comprises a current sensing resistor 516 and a transistor 517 whose base emitter junction shunts the current sensing resistor 516. The collector 518 of transistor 517 is coupled through a resistor 538 to the junction 582 of the Zener diode 535 and the resistor 547. The signal applied by transistor 517 to this junction 582 modifies the reference voltage applied to the operational amplifier 534 and in the specific instance of very large currents flowing through sensing resistor 516 modifies the reference voltage sufficiently so that the regulation circuitry of the converter circuit operates in a current regulating mode rather than a voltage regulating mode.

Figure 6:
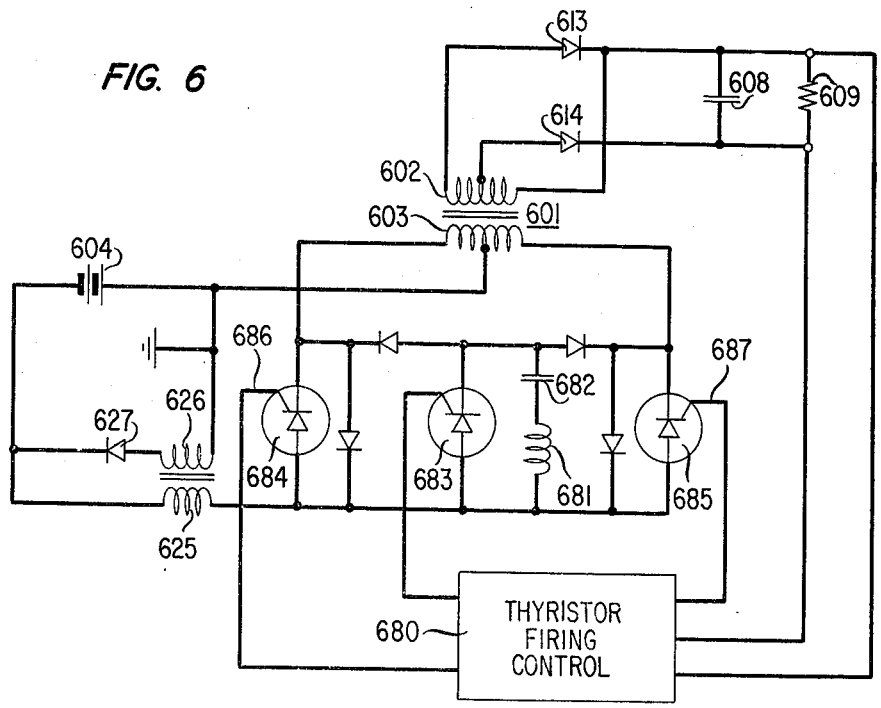
FIG. 6 discloses a schematic of a pulse width modulated converter circuit utilizing silicon controlled rectifiers in place of switching transistors.

FIG. 6 discloses a regulated converter circuit operating in accordance with the principles of the invention wherein SCRs are utilized as the converter switching devices. As in the previously described circuits, the converter includes a voltage source 604 and a primary inductor 625. The primary inductor has a secondary winding 626 and a clamping diode 627. Two switching SCRs 684 and 685 are coupled to the primary winding 603 of transformer 601. The secondary winding 602 is coupled through two rectifying diodes 613 and 614 to an output filter capacitor 608 to the load 609. A thyristor firing control circuit 680 is coupled to the gating leads 687 and 686 of SCRs 685 and 684, respectively. The thyristor firing control circuit is also connected to control the SCR 683 which shunts a resonant commutating circuit comprising a capacitor 682 and an inductor 681. The commutating circuit operates to periodically terminate conduction in the two SCRs 684 and 685. The regulation of the converter output by control of the conduction overlap interval of the two SCRs 684 and 685 of the converter circuit is substantially the same as that described above in connection with the regulation control by overlapping conduction intervals described with reference to FIG. 3.

What is claimed is:
1. In a DC to DC converter,
   transformer means
   first and second switching means coupled to said transformer means,
   signal monitoring means responsive to a signal conducted by said transformer means,
   switch control means to cyclically operate said first and second switching means,
   said switch control means being responsive to said signal monitoring means to control conduction intervals of said first and second switching means, said switch control means operating to render each of said first and second switching means conducting during each cycle of operation for a time interval in excess of one-half the time period of each cycle of operation and nonconducting during each cycle of operation for a time interval less than one-half the time period of each cycle of operation, said first and second switching means thereby being alternately nonconducting and simultaneously conducting for a controlled time duration during each cycle of operation in order to maintain a predetermined regulated signal output magnitude to continuously energize a load at an output of said converter in response to the controlled time duration of simultaneous conduction.
2. A converter as defined in claim 1 further including current limiting means to limit current flow in said first and second switching means.
3. A converter as defined in claim 2 including terminal means to accept an energy source, and said current limiting means comprises an inductor coupling said terminal means to said first and second switching means.

4. A converter as defined in claim 3 including voltage clamping means coupled across said terminal means and comprising a series connection including a second inductive winding magnetically coupled to said inductor and a clamping diode.

5. A power supply circuit comprising a transformer including,
a first transformer winding having first and second end terminals,
first and second switching devices coupled to said first and second end terminals, respectively,
signal monitoring means to monitor an output signal of the power supply,
bias control means responsive to said signal monitoring means to periodically bias said first and second switching devices alternately nonconducting and simultaneously conducting for a controlled time duration each cycle of operation, said bias control means operating to render each of said first and second switching devices conducting during each cycle of operation for a time duration in excess of one-half of a time period of each cycle of operation and nonconducting during each half cycle of operation for a time duration less than one-half of a time period of each cycle of operation, and
current limiting means to limit current flow in said first and second switching devices whereby the controlled time duration of simultaneously conducting intervals of said first and second switching devices controls the output signal of said power supply in order to maintain a predetermined regulated output signal magnitude to continuously energize a load at an output of said power supply.

6. A power supply circuit as defined in claim 5 wherein said bias control means comprises,
triangular wave generation means to generate triangular waveforms,
threshold signal generation means responsive to said signal monitoring means to generate first and second signal threshold levels, and
switching device drive means coupled to said triangular wave generation means and said threshold signal generation means, said switching device drive means responsive to a magnitude comparison of said triangular waveform and said first and second signal threshold levels to bias said first and second switching devices nonconducting when the magnitude of said triangular waveform exceeds said first and second signal threshold levels.

7. A power supply circuit as defined in claim 5 wherein said signal monitoring means comprises,
a voltage divider shunting a signal output of said power supply,
a signal amplifier having a first reference signal input and a second input coupled to said voltage divider,
a differential amplifier having a second reference signal input and a third input coupled to said signal amplifier and having dual outputs to establish first and second threshold signal levels,
a triangular wave generator and comparator means to compare a triangular wave output of said triangular wave generator with said first and second threshold signal levels, and
driving means responsive to said comparator means to control said first and second switching devices.

8. A power supply circuit comprising,
a power transformer including at least a primary winding having a center tap and two end terminals,
first and second switching devices,
an inductor connected to said center tap and having sufficient inductance to limit peak transient currents of said power transformer and said first and second switching devices,
signal detection means coupled to monitor a signal reflective of the signal magnitude conducted by said first and second switching devices,
conductive control means coupled to operate said first and second switching devices in a cyclic mode of operation and responsive to said signal detection means and operating to control the time duration of conductivity of the first and second switching devices during each cycle of operation, said conductive control means biasing each of said first and second switching devices in a conducting state during each cycle of operation for a time duration greater than one-half of the time period of each cycle of operation, and in a nonconducting state during each cycle of operation for a time duration less than one-half of the time period of each cycle of operation, whereby said first and second switching devices are alternately in a nonconduction state and simultaneously in a conduction state, the state of simultaneous conduction having a controlled time duration wherein the controlled time duration of simultaneous conduction is utilized to regulate the signal monitored by said signal detection means in order to maintain a predetermined regulated signal output to continuously energize a load at an output of said power supply 9. Power supply regulation means comprising:
means to periodically bias first and second switching devices alternately nonconducting and simultaneously conducting;
means to monitor a signal to be regulated whose magnitude is responsive to conduction in said first and second switching devices;
said means to bias responsive to said means to monitor and including:
means to establish a periodic cycle;
means coupled to a reference signal to compare said signal to be regulated to said reference signal; and
means to control an interval of simultaneous conduction of said first and second switching devices in response to said means to compare, said means to control operating to render each of said first and second switching devices conducting during each periodic cycle of operation for a time interval in excess of one-half the time period of each periodic cycle of operation and nonconducting during each periodic cycle of operation for a time interval less than one-half of the time period of each periodic cycle of operation in order to maintain a predetermined regulated output signal magnitude to continuously energize a load at an output of said power supply.

10. Power supply regulation means as defined in claim 9 further including current limiting means coupled to said first and second switching devices.

11. Power supply regulation means as defined in claim 9 wherein said means to establish a periodic cycle comprises periodic signal generating means, said means to compare including means to generate threshold signal levels and said means to control comprising means responsive to said periodic signal generating means and said threshold signal levels to bias said first and second switching devices simultaneously conducting.

* * * * *